Figure 1:
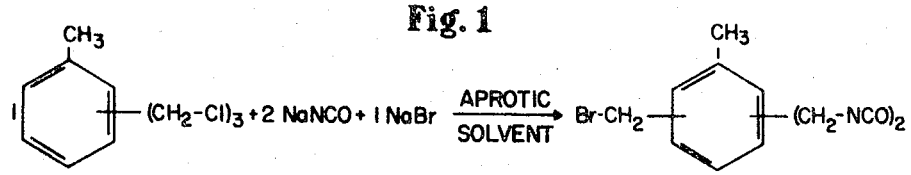
Figure 1:
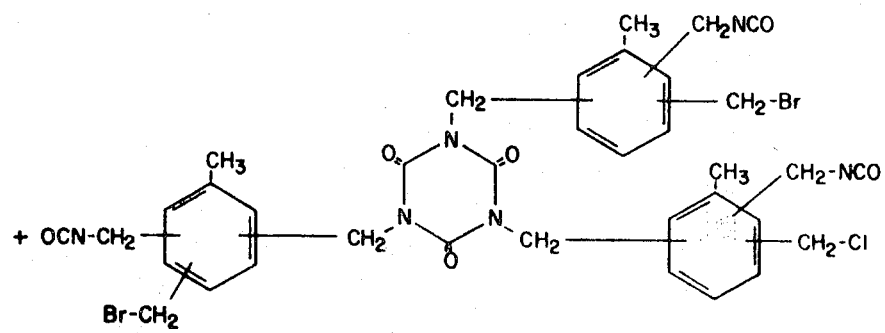
Figure 1:
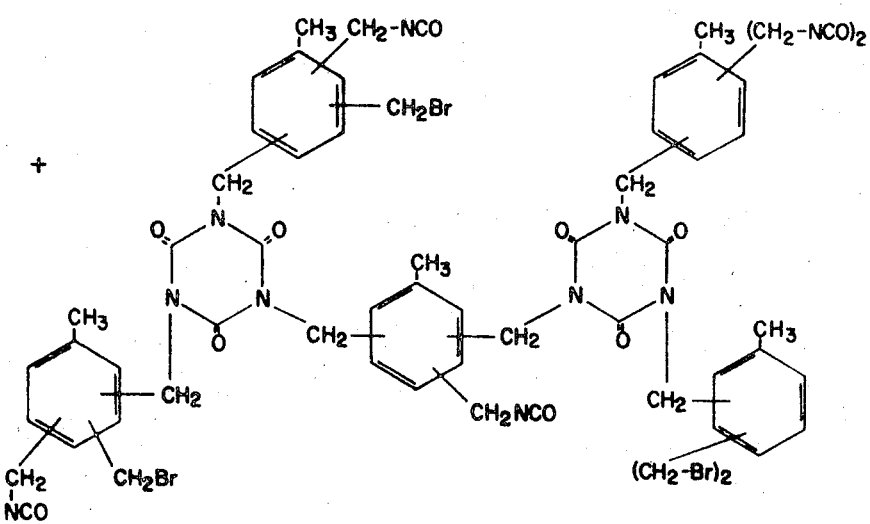

United States Patent [19]
Argabright et al.

[11] 3,773,695
[45] Nov. 20, 1973

[54] ISOCYANURATE AND HALOGEN-CONTAINING POLYISOCYANATES

[75] Inventors: Perry A. Argabright; Brian L. Phillips, both of Littleton, Colo.

[73] Assignee: Marathon Oil Company, Findlay, Ohio

[22] Filed: June 24, 1971

[21] Appl. No.: 156,549

Related U.S. Application Data
[62] Division of Ser. No. 830,410, June 4, 1969, Pat. No. 3,627,689.

[52] U.S. Cl. 260/2.5 AW, 260/22 TN, 260/77.5 CH, 260/77.5 NC, 260/248 NS
[51] Int. Cl... C08g 22/02, C08g 22/22, C08g 22/44
[58] Field of Search............... 260/77.5 NC, 2.5 AW

[56] References Cited
UNITED STATES PATENTS

| | | |
|---|---|---|
| 3,458,448 | 7/1969 | Argabright et al.................. 252/182 |
| 3,641,024 | 2/1972 | Argabright et al.................. 260/248 |
| 3,526,624 | 9/1970 | Argabright et al.................. 260/248 |
| 3,549,630 | 12/1970 | Argabright et al.................. 260/22 |
| 3,553,122 | 1/1971 | Argabright et al.................. 260/22 |
| 3,573,259 | 3/1971 | Argabright et al.................. 260/77.5 |

Primary Examiner—Donald E. Czaja
Assistant Examiner—H. S. Cockeram
Attorney—Joseph C. Herring et al.

[57] ABSTRACT

New halogenated polyisocyanates containing isocyanurate rings are prepared in a single stop by reacting chlorinated organic compounds, especially chloromethylated aromatics, with metal iodide or bromide and metal cyanate in the presence of a dipolar aprotic solvent where the mole ratio of cyanate in the metal cyanate to chlorine in the chlorine containing organic compound is from about 0.25 to less than about 0.8. The polyisocyanate compositions are useful as starting materials in the production of urethane polymers as coatings, films, foams, adhesives, etc. The compositions are especially flame retardant, and have inherent thermal stability provided by the high concentration of isocyanurate rings in the molecule and from the presence of halide groups.

14 Claims, 2 Drawing Figures

ISOCYANURATE AND HALOGEN-CONTAINING POLYISOCYANATES

CROSS-REFERENCES TO RELATED APPLICATIONS

This application is a division of Ser. Number 830,410 (now U.S. Pat. No. 3,627,689), filed June 4, 1969 and assigned to Marathon Oil Company.

U. S. application Ser. No. 611,588, filed Jan. 25, 1967 (now U.S. Pat. No. 3,458,448), and assigned to the assignee of the present invention, relates to the preparation of polyisocyanate compositions similar to those of the present invention but lacking halogen substituents.

BACKGROUND OF THE INVENTION

Polyisocyanates, particularly tolylene diisocyanate (TDI) are widely used in the production of polyurethane polymers as coatings, films, foams, adhesives, and elastomers, for example. Urethane polymers offer advantages wherever superior resistance to abrasion, acid, alkali, and weather is required. Polyurethane foams are particularly suitable for thermal and sound insulation as well as resilience. Significant disadvantages of presently available urethane compositions have been their tendency to discolor (yellowing) and degrade when exposed to sunlight, their lack of thermal stability, and general flammability.

halogen atoms attached to carbon atoms having no $\beta$-hydrogen atoms, is known to impart flame-retardancy to organic materials.

SUMMARY OF THE INVENTION

We have found that halogen-containing polyisocyanates having excellent flame retardant characteristics are prepared in a one step process by reacting chlorine containing organic compound(s) with a metal cyanate and a metal iodide or bromide in the presence of aprotic solvent as defined herein and where the mole ratio of cyanate in the metal cyanate to chlorine in the chlorine containing starting material is from about 0.25 to less than about 0.8. The presence of halogen groups in the polyisocyanate product as well as the presence of isocyanurate rings impart flame retardancy to the compositions. These compositions are starting materials for various polymeric systems (e.g., rigid polyurethane foams) produced by conventional polymerization or copolymerization with an appropriate monomer, (e.g., a polyester or polyether based polyol). Particularly preferred products are the polyurethane and polyurea foams, elastomers, adhesives, and coatings.

PREFERRED EMBODIMENTS OF THE INVENTION

The overall reaction of this invention may be summarized as follows:

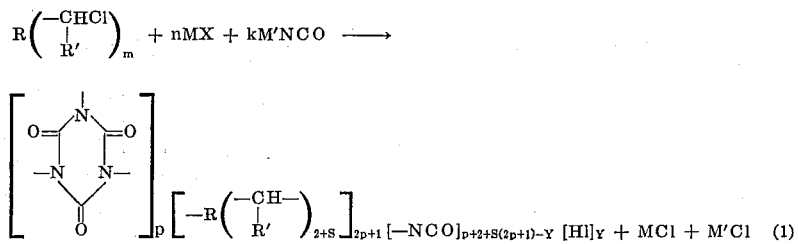

The present invention permits the production of new halogen-containing isocyanates in which the nitrogen of the isocyanate radical (—N=C=O) is not attached to an aromatic ring. It has been discovered that polymers derived from isocyanates having this special molecular characteristic are markedly more resistant to degradation and yellowing than are the polymers produced from conventional isocyanates in which the nitrogen of the isocyanate group is attached to an aromatic ring. These polyisocyanate product mixtures contain at least about 0.1 and preferably from 10 to about 75 mole percent (based on the total moles of nitrogen in the compositions) of isocyanurate groups which have been discovered to render additional thermal stability and resistance to degradation of finished polymers. It has also been observed that the incorporation of isocyanurate rings into a polymeric structure increases the flame retarding properties of the structure. These products preferably have at least 0.5 and more preferably at least 2.0 milliequivalents (meq) free isocyanate content per gram of product. Furthermore, the products preferably contain from about 5 to about 50 and more preferably from about 10 to about 30 weight percent halogen.

Another advantage of this invention is realized by using relatively inexpensive alkali metal halides as the source of halogen for incorporation into the polyisocyanate composition, rather than a relatively costly source generally provided by using a halogen gas or hydrogen halides. The presence of halogen, especially Halogenated Isocyanurate Containing Polyisocyanates
where R is polyvalent and may be aliphatic, aromatic, heterocylic, aralkyl, alicyclic, olefinic, acetylenic, alkaryl, and non-interferring substituted derivatives thereof for example, lower alkyl group, e.g., methyl, ethyl, isopropyl; halogen, e.g., chlorine, bromine, iodine; aryl, e.g., phenyl, naphthyl; alkoxy or aryloxy, e.g., methoxy, phenoxy; nitro and cyano. Examples of R include:

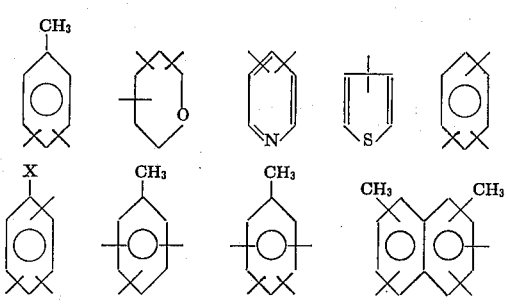

where X is halogen

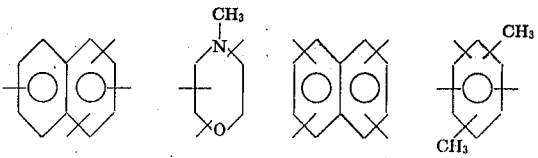

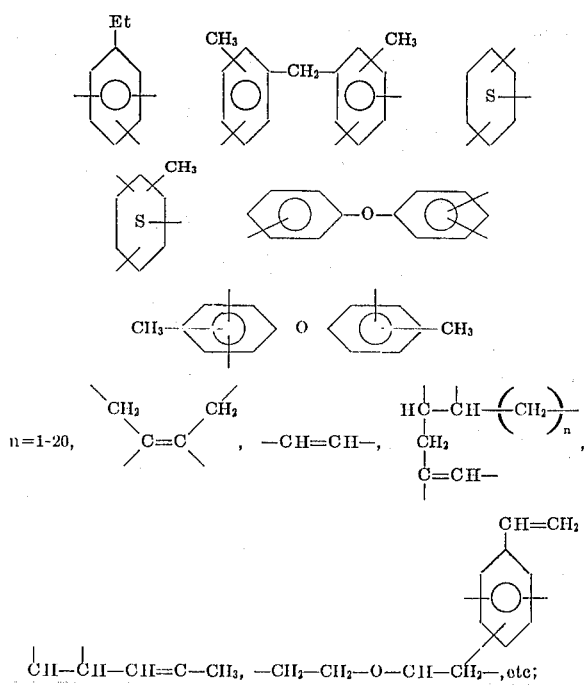

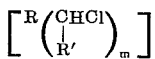

and where R' may be hydrogen (preferred), lower alkyl (e.g. $CH_3$, $CH_3CH_2-$, $n-C_4H_9$) aryl (e.g. phenyl, naphthyl, α-furyl). Combinations of organic polychlorides

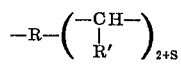

may be used as feed materials.

M and M' = alkali or alkaline earth metals, for example Li, Na, K, Rb, Cs, Be, Mg, Ca, etc. where M and M' may or may not be the same.

X = bromine or iodine selected from iodide, bromide, and combinations thereof.

Mixtures of metal bromides and metal iodides (e.g. NaBr + KI) are within the scope of this invention.

$m$ = the average number of chloroalkylated substituents, and equal to or greater than two (2) (more fully discussed below)

$n$ = number of moles of metal iodide or bromide (more fully discussed below).

$k$ = number of moles of metal cyanate (more fully discussed below).

In the products, Hl = halogen (chlorine, bromine or iodine), $2 + S$ = number of —CHR'— groups.

Y = number of halide groups.

$p$ = number of isocyanurate groups (0–15).

$2p + 1$ = number of $$-R-\left(\begin{matrix}-CH-\\ |\\ R'\end{matrix}\right)_{2+S}$$

groups = number of R groups $p + 2 + S(2p+1) - Y$ = number of isocyanate groups.

Products as depicted in equation 1 (vide supra) do not contain nitrogen to nitrogen (N—N) or nitrogen to halogen (N—Hl) bonds or groups.

By aprotic solvents is meant compositions which are liquid under the conditions of the reaction, which have a high dielectric constant (greater than about 15 at 25°C), which are dipolar, that is, one part of the molecule has a more positive electrical charge relative to the other parts of the molecule causing the molecule to act as a dipole, are sufficiently inert not to enter into deleterious side reactions to a significant degree under the reaction conditions and which do not possess hydrogen atoms capable of hydrogen bonding with or transferring to anions in solution in the reaction mixture. The aprotic solvent can be composed of a mixture of liquids so long as the overall liquid compositions meet the above criteria. Preferred among the aprotic solvents are N-alkyl pyrrolidones (e.g., N-methyl pyrrolidone), N,N-dialkyl amides (e.g., N,N-dimethyl formamide [DMF] and N,N-dimethylacetamide), nitriles (e.g. acetonitrile), hexasubstituted phosphoramides (e.g., hexamethylphosphoramide), tetraalkylureas (e.g. tetramethyl urea), sulfoxides (e.g., dimethylsulfoxide), and sulfones (e.g. diphenyl sulfone), especially those in which substituents are alkyl groups, preferably methyl groups. The most preferred solvent for the reaction of this invention is DMF. Preferably, from about 0.05 to about 50 and more preferably from about 0.2 to about 2.0 liters of aprotic solvent will be present for each mole of chloroalkyl group present.

Preferred chloroalkylated organic feeds are the chloromethylated aromatics prepared by reacting, for instance, an aromatic hydrocarbon with formaldehyde, or a suitable precursor, and hydrogen chloride in the presence of a catalyst such as a Lewis acid (e.g., zinc chloride). The chloromethylation of aromatics is well known in the art (See, for instance, Olah, *Friedel Crafts and Related Reactions*, V. II, part 2, Interscience Publishers, N.Y., 1964), and all of the various hydrocarbon feed stocks which may be chloromethylated and do not interfere with the production of halogen and isocyanurate containing polyisocyanates of the present invention are within the scope of this invention. Preferably, the hydrocarbon feed stock to be chloromethylated is selected from the group of benzene, toluene, xylene, (para, ortho, and meta isomers), naphthalene, and non-interferring derivatives thereof (e.g., chloromethyl derivatives) with toluene or its derivatives being most preferred. The product mixture produced in the chloromethylation reaction may be used directly as the feed stock in the present invention with the provision that the average value of $m$ is at least about 2.0 and more preferably between 2.2 and 6 and most preferably between 2.5 and 4. For instance, a mixture and di- and tri-chloromethyl substituted toluenes is within the scope of this invention.

Although the polyalkylchlorinated organic starting materials are preferably prepared by a chloromethylation reaction, any method may be used so long as the chlorinated product, if aromatic, has at least an average of two chlorine substituents per molecule which are not directly bonded to the nucleus of the aromatic ring. Preferably, the chlorines are bonded to lower alkyl hydrocarbon polyvalent radicals, especially methyl. Other methods for preparing the polyalkyl chlorinated organic starting materials are well known in the art. For example, suitable starting materials are prepared by reacting xylene, mesitylene, or 2,6-dimethylnaphthalene, for example, with molecular chlorine in the presence of ultraviolet light or any other free radical initiator.

The mole ratio (k/m) of metal cyanate to chloroalkylated compound is preferably from about 0.25 to less than 0.8 and more preferably from about 0.3 to about 0.75, and most preferably from about 0.35 to about 0.7. Any ratio above about 0.8 gives a polyisocyanate product which has an insignificant number of halogen substituents thereon to enhance its flame retardant characteristics and is unsuitable for the purposes of this invention.

The polyisocyanate product may have some chloroalkyl groups substituted thereon as well as bromoalkyl or iodoalkyl groups, but in the preferred embodiment, a substantial portion (greater than 20 mole percent, preferably greater than 50 percent) of the total halogen in the product will consist of Br and/or I. It is generally known that bromine and iodine are better than chlorine for flame retardancy imparting characteristics. In the reaction of the present invention, preferred metal halides are sodium bromide, potassium bromide, sodium iodide, and potassium iodide which are all readily soluble in the most preferred solvent, DMF. When using sodium bromide, by-product sodium chloride is formed (see equation 1) which is insoluble in DMF and separation from the product polyisocyanate is readily achieved by decantation, filtration, or by other well known liquid-solid separation methods. Preferably, the ratio of number of moles ($n$) of metal halide to the number of moles of chlorine in the organic polychloride feed ($m$) is from about 0.25 to about 0.80 and most preferably from about 0.30 to about 0.65.

The cyanation reaction is preferably conducted at temperatures of from about 25 to about 300° and most preferably of from about 50 to about 150°C. Pressure is not narrowly critical and may be from below 1 atmosphere to over 10,000 psig. In most cases it will be preferable to conduct the reaction in the absence of water on a batch-type basis, although flow systems with continuous inflow of reactants may be utilized. The most convenient apparatus will, in most cases, be a conventional tight lid varnish cooker or similar reactor having a reflux condenser, provision for agitation, and the usual controls for temperature and pressure. The pressure of the reaction, of course, will depend upon the vapor pressure of the solvent utilized and the desired reaction temperature. The reaction time will depend on the nature of the polyisocyanate being prepared and may range from about 0.05 to about 24 hours. Generally, the reaction will take from about 0.1 to about 0.5 hours for the most preferred starting materials and reaction conditions.

The products of this invention are halogenated isocyanurate containing polyisocyanates, i.e. they contain from 0 to 15 isocyanurate rings

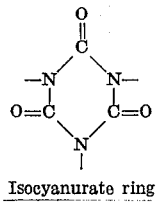

Isocyanurate ring halogen (Br, Cl or I), and isocyanate groups (—NCO) whose N is not directly attached to an aromatic ring. The products may be made from a single polyhalide reactant or alternatively from a mixture of polyhalides.

Figure 2:
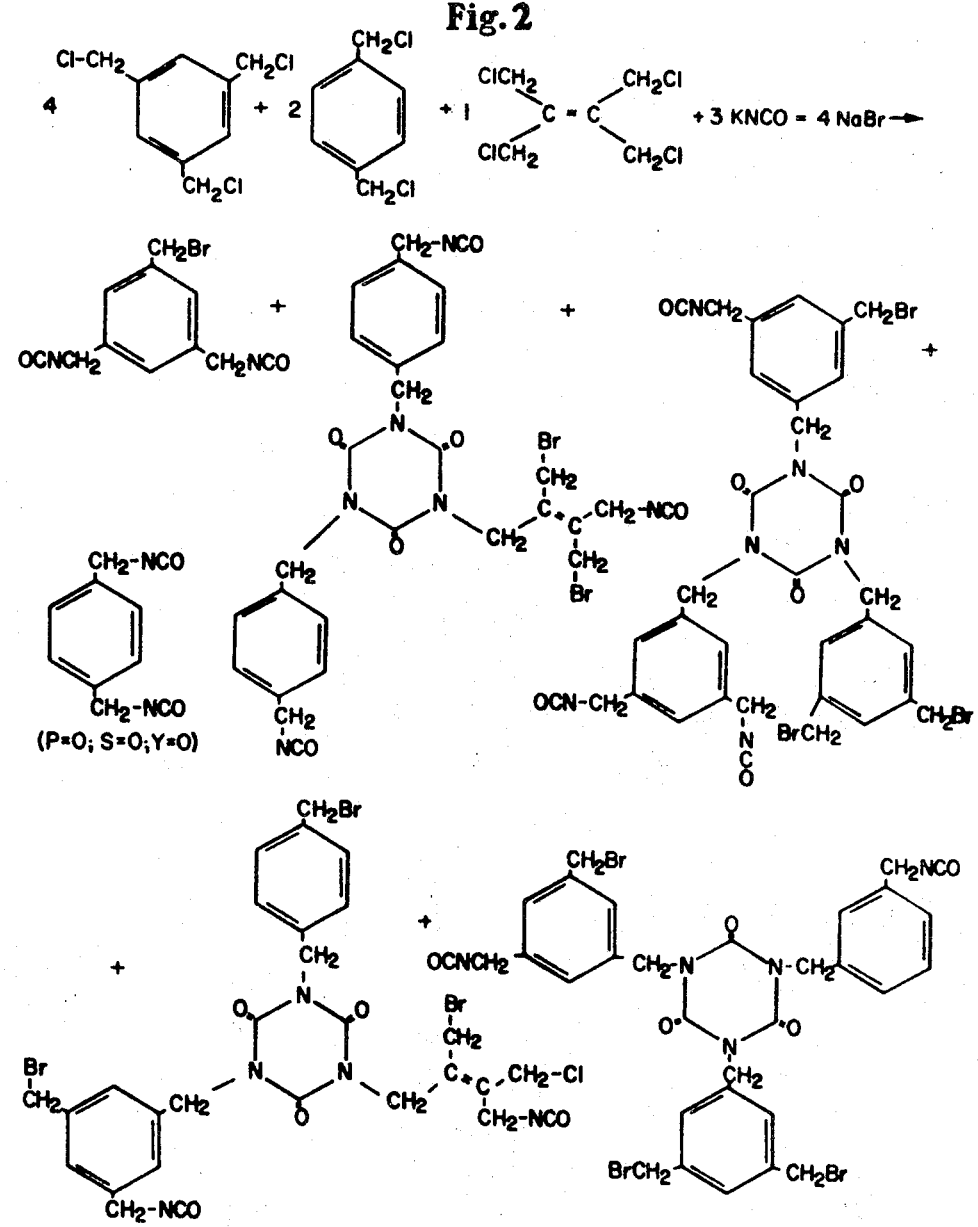

For illustrative purposes, FIGS. 1 and 2 in the drawings are set forth to further clarify the scope of this invention as described in Equation 1 and to depict exemplary structures obtained from either a single polyhalide (FIG. 1) or from polyhalide mixtures (FIG. 2).

The following examples are illustrative of preferred embodiments of this invention but are not meant to limit it in any way. A variety of modifications and variations will become obvious to those skilled in the art upon a reading of the present application, and all such obvious variations and modifications are to be taken as being within the scope of the claims appended hereto.

EXAMPLE I

Chloromethylation of Bis(chloromethyl) toluene 48.25 g. bis(chloromethyl)toluene, 11.2 g. paraformaldehyde, 21.0 g. zinc chloride, 4.5 g. water, and 50 ml of n-heptane are charged to a vented all glass reactor equipped with a mechanical stirrer, a reflux condenser, a gas inlet tube, and a temperature controller. The reactants are stirred together and HCl is purged through the mixture. Monitored flow meters maintain a constant excess of HCl throughout the mixture. The reaction is maintained at 20°C for a period of 4 hours, then cooled to room temperature and allowed to stand, upon which three phases form. A large amount of white solid crystallizes from the upper organic layer. Benzene is added to the mixture and stirred well to dissolve the white solid and combine the upper two phases, while continuing purging with nitrogen to remove excess HCl. The mixture is placed in a separatory funnel and the lower aqueous-catalyst phase is removed. The organic phase is then washed with 200 ml. of water, followed by 200 ml. of 5 percent sodium bicarbonate, and then again with 200 ml. of water. The organic solution is dried over magnesium sulfate, filtered clear, and concentrated on a rotating evaporator. 50.3 g. of a yellow oil which crystallizes upon standing is obtained. The product is clay treated in benzene, filtered, and distilled under vacuum pump pressure to remove benzyl chloride and any remaining solvent. The distillation is stopped when the overhead temperature reaches 65°C at 75 mm. Hg. The product (A) solidifies on cooling and is identified as a mixture of 2,4 bis(chloromethyl)-toluene (10.7 weight percent), tris(chloromethyl)toluene (61.9 weight percent) and a mixture of chloromethylated di-tolylmethanes (27.4 weight percent) by gas liquid chromatography. By elemental analysis, this residue contains about 40 percent chlorine.

Cyanation of Product A 30 g. of the above residue mixture (containing 0.35 moles chlorine), 15.1 g. (0.23 mole) sodium cyanate, 11.9 g. (0.17 moles) sodium bromide, and 200 ml. anhydrous dimethylformamide (DMF) is charged to an all glass reactor equipped with a mechanical stirrer and nitrogen inlet with controls for temperature and pressure. The reactants are stirred together under a low pressure nitrogen atmosphere and heated to reflux and held at that temperature for about 10 minutes. The reaction mixture is then cooled to about 10°C with an ice bath, and filtered to collect the insoluble salts. The DMF filtrate is concentrated on a rotating evaporator at 75°C and at 7 mm. Hg. The residue obtained is 38.3 g. of a viscous oil. Infrared analysis shows the product to have 4.14 megs. NCO/g. By elemental analysis the product contains about 6.5 percent Cl, and 19.1 percent Br.

EXAMPLE II 11.87 g (0.15 mole) 2,4,6 tris(chloromethyl) toluene (99 percent pure), 6.5 g (0.10 mole) sodium cyanate, 5.92 g (0.058 mole) sodium bromide, and 67 ml DMF (dist. from $CaH_2$) are stirred at reflux under $N_2$ for 10 minutes. The reaction mixture is cooled immediately and then filtered to remove insolubles. The DMF is removed from the filtrate in vacuo with a flash evaporator, and the residue left behind is stirred well with about 150 ml benzene. After filtering off the insolubles, the benzene is removed leaving a fluid yellow oil, wt. 13.0 g. Analyses of the oil indicate the following:

% chlorine    4.76
% bromine    19.51
Free isocyanate (by infrared)    6.15 meg/g

EXAMPLE III

This example demonstrates the excellent flame retardant characteristics of polyurethanes made from the polyisocyanates of this invention.

A bromine containing polyisocyanate is prepared according to the method of Example II. The product contains 20.4 percent Br and 18.1 percent free isocyanate.

A prepolymer is prepared by combining 10 g of the polyisocyanate with 0.8 g. of Pluracol TP-440 (propylene oxide and trimethylol propane based triol manufactured by the Wyandotte Chemical Corp.) and stirring the mixture at 75°C in a nitrogen atmosphere for a period of 2 hours.

A rigid foam is prepared as follows:
Component A
    Prepolymer (above)    5 g
    Silicone L-45 (Union Carbide)    0.02 g
Component B
    Quadrol Polyol (Wyandotte)    1.2 g
    Trichlorofluoromethane    0.6 g Components A and B are mixed together, poured into a mold, and allowed to rise. The foam is tack free in 15 minutes. After curing overnight at room temperature, the rigid foam is found to be self-extinguishing when subjected to an oxygen-methane torch. The foam would not sustain combustion even under these severe conditions.

What is claimed is:

1. A polyurethane composition comprising the reaction product of a polyol and a mixture of polyisocyanates having a mole ratio of from about 0.25 to less than 0.8 metal cyanate groups per chloro-alkylated group; said mixture being comprised of:
   a. from about 0.1 to about 75 mole percent of the total nitrogen content in the form of isocyanurate rings;
   b. from about 5 to about 50 weight percent combined halogen and
   c. at least 0.5 milliequivalents of —NCO groups per gram of said mixture of polyisocyanurates; said polyurethane compositions comprising the structure:

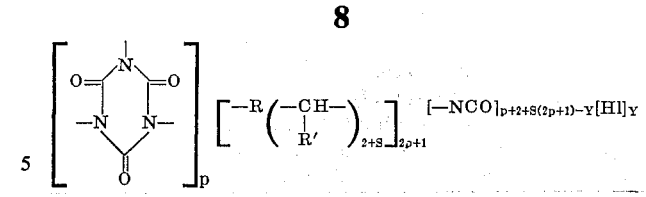

wherein R is a polyvalent radical selected from the group consisting of aliphatic, aromatic, heterocyclic, aralkyl, alicyclic, olefinic, acetylinic, alkaryl, and non-interfering substituted derivatives thereof, wherein R' is selected from the group consisting of hydrogen, lower alkyl, and aryl, wherein Hl is halogen selected from the group consisting of chlorine, bromine, or iodine, wherein Y is the number of halide groups, wherein p is the number of isocyanurate groups, and is from about 0 to about 15 and wherein the products do not contain nitrogen-to-nitrogen bonds or nitrogen-to-halogen bonds.

2. A polyurea composition produced by reacting a polyamine with the mixture of polyisocyanates of claim 1.

3. A polyurethane foam produced in the presence of a blowing agent by the reaction of a polyol with the mixture of polyisocyanates of claim 1.

4. A thermally stable, flame retardant polyurethane foam produced in the presence of a blowing agent by the reaction of a polyol with the mixture of polyisocyanates of claim 3.

5. A flame retardant polyurethane coating formulation made with the composition of claim 1.

6. Solids coated with the coating formulation of claim 5.

7. Polyurethane elastomers of high thermal stability produced from a polyisocyanate product comprised of the products of claim 1.

8. Flame retardant polyurethane elastomers produced from a polyisocyanate product comprised of the products of claim 1.

9. Flame retardant polyurethane coatings produced from a polyisocyanate product comprised of the products of claim 1.

10. Flame retardant coatings produced from a polyisocyanate product comprised of the products of claim 1.

11. Moisture cured flame retardant coatings produced from a polyisocyanate product comprised of the products of claim 1, having an excess of NCO groups.

12. Flame retardant unsaturated urethane drying oil coatings produced from a polyisocyanate product comprised of the products of claim 1.

13. Flame retardant adhesives produced from a polyisocyanate product comprised of the products of claim 1.

14. Flame retardant films produced from a polyisocyanate product comprised of the products of claim 1.

* * * * *

UNITED STATES PATENT OFFICE
CERTIFICATE OF CORRECTION

Patent No. 3,773,695        Dated November 20, 1973

Inventor(s) P. A. Argabright et al

It is certified that error appears in the above-identified patent and that said Letters Patent are hereby corrected as shown below:

| | |
|---|---|
| Abstract, line 2: | Delete "stop" and insert therefor --step--. |
| Col. 4, line 48: | Delete "and" (second occurrence) and insert therefor --of--. |
| Col. 6, line 22: | Delete "20°C" and insert therefor --70°C--. |
| Col. 6, line 66: | Delete "megs" and insert therefor --meqs--. |
| Col. 7, line 16: | Delete "meg/g" and insert therefor --Meq/g--. |

Signed and Sealed this

Sixth Day of September 1977

[SEAL]

Attest:

RUTH C. MASON
*Attesting Officer*

LUTRELLE F. PARKER
*Acting Commissioner of Patents and Trademarks*